Patented Nov. 17, 1931

1,832,355

UNITED STATES PATENT OFFICE

FRANK G. BREYER, OF NEW CASTLE, DELAWARE, ASSIGNOR, BY MESNE ASSIGNMENTS, TO KREBS PIGMENT & COLOR CORPORATION, OF WILMINGTON, DELAWARE, A CORPORATION OF DELAWARE

SOFT TEXTURED LITHOPONE

No Drawing.  Application filed January 14, 1929.  Serial No. 332,572.

My invention pertains to soft-textured lithopone pigments and to processes for producing such pigments. Lithopone pigments of soft texture are particularly advantageous for use when it is desired to produce paints of a velvety or enamel nature and my invention provides a simple and convenient process for the production of such paints and enamels.

The pigment manufacturer distinguishes a soft-textured pigment from a hard-textured pigment by the ease with which the former material breaks down to form a fine, smooth, uniform pulp in the wet milling process to which all such pigments are subjected before they are finally separated from water and dried. The pigment expert and the "paint grinder" differentiate these two types of pigments by the ease with which the soft-textured pigment "works down" in the paint oil or other vehicle, either on the test palette or in the practical paint mill, to form a homogeneous uniformly fine, grainless suspension which is capable of producing a uniform grainless film. The relative softness of texture is particularly manifest when the pigment is incorporated in high concentration in the paint vehicle, for example, when more than seven pounds of pigment are present in a gallon of the finished paint or enamel.

While the palette rub-down test is dependent to some extent on the personal equation, concordant results may readily be obtained by different persons if a uniform scheme of operation is followed. Since this test provides the easiest method of determining the softness of texture of lithopone, I shall describe it in some detail as applied to samples of lithopone of varying texture.

Stage I

A small heap of dry lithopone, such as may be balanced on the end of a spatula about three quarters inches in width, is deposited on a smooth surface such as a glass plate. A small quantity, say about ten drops, of linseed oil is placed on the heap and the oil is incorporated with the pigment by circulatory strokes with the flat blade of the spatula. This operation is the same as that produced on an industrial scale in an ordinary paint mixer. The work with the spatula should be terminated as soon as the oil is thoroughly incorporated with the pigment to form a paint smear, though more oil should naturally be added if an incorrect estimation was made in the first instance.

The reaction of hard-textured and soft-textured lithopones to this stage of the test is as follows:

(a) Other things being equal, the soft-textured lithopone is much the easier working product.

(b) If the soft-textured lithopone has been properly milled, the paint smear thus produced is smooth, glossy, and relatively free from "pimples", though the grain of the particles may easily be seen. Parenthetically it should be remarked that the lithopone manufacturer distinguishes between "pimples" and the natural grain of the particles or aggregates in the film by the fact that the former appear to be actual raised points in the paint smear, whereas the grain, so-called, consists of visible particles or aggregates embedded in the film.

At the close of Stage I of the test, a hard textured lithopone smear will usually show a greater number of "pimples" and of visible aggregates.

Stage II

In the second stage of the test the paint smear is vigorously worked with the spatula in an effort to eliminate pimples and aggregates, the working ordinarily being continued for two or three minutes.

The reaction of hard-textured and soft-textured lithopones to this stage of the test is as follows:

(a) Other things being equal, the soft-textured lithopone is much the easiest product to work, and produces the smoothest smear.

(b) By proper "rubbing down", pimples may usually be eliminated from either type of smear.

(c) Some of the aggregates of hard-textured lithopone are difficult if not impossible to reduce by rubbing down. When such aggregates are reduced by exerting pressure with the spatula, streaks appear in the paint smear.

Stage III

A small portion of the paint smear from Stage II is placed on a glass plate and is thoroughly rubbed down with the spatula, an effort being made to secure a film or smear so thin that the lithopone particles form but a few layers.

The reaction of hard-textured and soft-textured lithopones to this stage of the test is as follows:

(a) The film of soft-textured lithopone is perceptably smoother than the film of hard-textured pigment. It contains no visible aggregates, or, at the worst, a very much smaller number than that present in the film of hard-textured lithopone.

(b) When the edges of the films on the plates are viewed in transmitted light, the soft-textured lithopone will be seen to present a bluer appearance, due to the greater fineness of the particles.

It will be realized that the best comparisons of texture in lithopone can be obtained when the samples undergoing test do not vary greatly in other properties. For example, a wide variance in the oil absorption of the two samples, or in their respective hiding powers or colors, will tend to detract from the clearness of the differentiation in texture, unless due account is taken of the varying character of the pigments when the observations are made.

To bring out the desirable qualities of the lithopone pigments it is necessary to muffle or calcine the previously dried product produced in the first step of the lithopone process—i. e. the "strike" or precipitate obtained by bringing together the component solutions of zinc salts and barium sulfide. During this muffling or calcining operation the particles of solid pigment produced by the "strike" grow in size, and if the muffling temperature is raised high enough, which it commonly is, the particles also sinter together more or less firmly.

After the muffling or calcining operation it is necessary to wet-grind the pigment in order to reduce the size of the aggregates formed by the sintering together of the individual particles. The strength of this sintering bond between the individual particles, if high, makes a hard textured pigment. If the strength of the sintering bond is low and the sintered aggregates are easily reduced by wet grinding or other equivalent operations, a soft-textured pigment results.

The simplest method of producing a soft-textured lithopone is to calcine at an abnormally low temperature, but the best color and the best pigment strength or whitening power cannot be attained by calcination at substantially less than 740° C. Moreover, due to the lack of growth in size of the particles when the muffling is conducted, at a relatively low temperature, so much true colloidal matter remains in the pigment that the resultant high factor of oil absorption of the product thus produced makes it unsuitable for most paint formulae. For example, it cannot be incorporated satisfactorily in paint oils in high concentration,—say seven pounds per gallon. The problem of producing a soft-textured pigment therefore becomes one of determining which variable factors in composition tend to strengthen, and which to weaken, the sintering bond produced as a necessary by-product of the required high temperature muffling operation.

In the past, pigment technologists have recognized the fact that certain agents, and particularly the chlorides and other salts and the hydroxides of sodium and potassium, have a marked effect in coarsening the texture of muffled pigments. This is easily understood because such alkalis are known to have a tendency to lower the fusion points or sintering points of pigment materials. It is therefore a common practice in the modern lithopone industry to endeavor to guard against the presence of excessive amounts of alkalis and alkali salts in the raw materials used for the production of lithopones. While careful attention to this detail results in some improvement in the softness of texture of lithopone I have now discovered a method by which an even softer-textured lithopone may be produced without lowering the calcining temperature and thus sacrificing other desirable pigment qualities.

My process and the resultant improved lithopone pigments have resulted from my discovery of a suitable type of reagent which may be mixed with the lithopone prior to calcination and which serves to weaken the sintering bond between particles of lithopone, which bond is ordinarily produced by calcination. When such a preventative of hard sintering is employed in admixture with the lithopone, the higher temperatures of calcination, such as are preferred in the industry for other reasons but which tend to produce a hard-textured product, may be employed, and a soft-textured pigment produced.

The reagent which I have found suitable for this purpose is hydrated basic magnesium carbonate. In practice, I prepare an intimate admixture of this substance with raw (precipitated) lithopone, usually by thoroughly mixing and agitating aqueous slurries of the two substances. I then calcine the mixture at a temperature within the range 740°–820° C. and finish the pigment by the ordinary quenching, wet-grinding, and drying operations.

Before proceeding to a detailed description of the exact manner of procedure and of the results obtained it should be noted that the present practice and invention is easily distinguishable from prior uses of magnesium compounds. Magnesium carbonate, for example, is an inert white substance which has been used as a filler or extender in the preparation of various pigments. It has also been used as an anti-acid substance. Magnesium carbonate has been incorporated in raw lithopone, in varying amounts, and has been calcined with the lithopone, being decomposed by the heat of calcination to produce the stable oxide.

Magnesium sulfate has also been added to raw precipitated lithopone as a conditioning agent.

In addition to prior practices in which magnesium compounds have purposely been added to lithopone it should be noted that some traces of magnesium compounds are ordinarily present in all lithopones as the result of impurities in the raw materials used in manufacture. Analyses of commercial lithopones made under my direction in 1920 showed MgO contents varying from .01–25%.

The present invention is distinguished from the prior art by the result obtained— i. e. a soft-textured product produced at normal calcination temperatures and having certain other advantages later to be described. The present invention is also distinguished from the prior art by the raw material employed—i. e. precipitated (hydrated) basic magnesium carbonate. Unlike magnesium compounds used in the prior art, this substance is very finely divided and contains an unusual amount of colloidal material—i. e. 0.2 mu and below. On account of its fine state of division, the preferred material may be thoroughly dispersed in an aqueous slurry and thoroughly mixed with the lithopone. The hydrated basic magnesium carbonate has a formula approximating $$4MgCO_3Mg(OH)_2 5H_2O.$$

It contains about 43% of magnesia (MgO) and about 36% of carbon dioxide, the remainder being water.

It is probable that the weakness of the sintering bond obtained by the use of this material in the lithopone is partially due to the large generation of gas which must occur during calcination, since the liberation of gases may well serve to reduce the strength of the sintering bond produced by calcination.

The present invention is also distinguished from the prior art by various process features, later described:

In my preferred practice, making use of this invention to produce a soft-textured lithopone most suitable for the highest grades of interior enamel, I proceed as follows:

Lithopone is precipitated in the ordinary manner and after the end point of the strike has been attained and the strike pulp is of uniform composition I add from 0.25 to 2% of hydrated basic magnesium carbonate in the form of a thoroughly dispersed and well-agitated pulp containing one part of material to about ten parts of water. I agitate the mixture during the addition and preferably for several hours subsequently, after which the mixture is filtered, dried, calcined within the range 740°–820° C., quenched, and wet-ground in the usual manner.

To aid in the thorough admixture of lithopone and magnesium compound I may add a dispersing agent such as sodium resinate, soap, Turkey red oil, or sodium silicate to the aqueous slurry at the time of mixing. The proportions of magnesium compound to lithopone may be varied upward from about 0.25% within a broad range. Less than 0.25% does not produce the full advantage of the invention. More than 2% may be used and a soft-textured product produced, but the use of larger quantities is not preferred since it results in a substantial adulteration of the lithopone.

The characteristics of the product obtained depend in part on the temperature of calcination. In general it may be stated that, to produce a given oil absorption, the novel product should be calcined at a temperature from 20–40° C. higher than ordinary lithopone. This is advantageous, since the higher temperature produces a better hiding power.

In the following tabulation, the effect of my invention on the oil absorption of lithopone calcined at various temperatures is illustrated. The oil absorption figures reported are those determined by the Gardner-Coleman method as described in circular #20 (February 1920), of the educational bureau, scientific section, of the Paint Manufacturers Association of the United States.

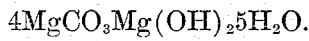

*Oil absorption*

| Calcination temp | A | B | C | D | E |
|---|---|---|---|---|---|
| 740 | 22.4 | 25.7 | 28.9 | 27.1 | 35.9 |
| 760 | 21.9 | 22.4 | 28.5 | 25.6 | 31.7 |
| 780 | 21.5 | 23.3 | 24.2 | 24.7 | 34.5 |
| 800 | 19.1 | 22.4 | 25.2 | 20.5 | 35.9 |
| 820 | 18.7 | 21.5 | 22.4 | 22.9 | 38.3 |
| Average | 20.7 | 23.1 | 25.8 | 24.2 | 35.3 |

A, no chemicals; B, 1.25% hydrated basic magnesium carbonate; C, same as B plus .10% sodium silicate; D, same as B plus .10% sodium resinate; and E, 10% hydrated basic magnesium carbonate.

Since the soft-textured lithopones manufactured in accordance with my invention may be and preferably are calcined at normal temperatures, i. e. 740–820° C., the hiding power of these materials is fully as good as, and is usually better than, the hiding power of good quality ordinary lithopones manufactured at the present time. The hiding power of my improved lithopone is ordinarily not less than 55 sq. cm./per gram when tested on the Pfund Kryptometer in accordance with the method described by Prof. J. H. Pfund in his article entitled "The hiding power of white pigments and paints" (see Journal of the Franklin Institute (1919) volume 188, pages 675–681).

The lithopone produced in accordance with my invention is soft in texture, and is equal in whiteness and in hiding power to the highest grades of ordinary lithopone produced in the usual manner. When mixed in a paint mill with ordinary paint oils in a concentration of about seven pounds per gallon it produces a fine grade of enamel which, when applied, produces uniformly-fine, grainless, glossy paint film. Its softness of texture makes it exceptionally easy to grind, and hence permits a considerable economy in manufacture. The quality of finished lithopone depends to a considerable extent on the uniformity of particle size and the absence of coarse unreduced aggregates. While some manufacturers are content to produce a cheap product containing coarse aggregates, the best lithopone is ground to a "standard sizing test". Lithopone meeting this test is so free from coarse aggregates that less than .05% of the product stays on a 325 mesh screen.

The extreme softness of texture of the improved product produced in accordance with my invention is indicated by the fact that it may be wet-ground to standard sizing test (a standard slurry of 4 parts water and 1 part pigment being used) in from $\frac{1}{5}$–$\frac{1}{2}$ of the time required for ordinary lithopone. A further measure of the softness of texture of my improved product is indicated by the power consumed in ordinary wet mills in reducing the pigment to standard sizing test. The power expenditure for grinding ordinary lithopone amounts to about 40–50 kilowatt hours per ton, whereas my improved product may be ground to the same state of finess with a power expenditure of about 5–10 kilowatt hours per ton.

I claim:

1. A composition of matter comprising raw lithopone containing particles of hydrated basic magnesium carbonate in intimate admixture therewith.

2. A process for producing a soft-textured lithopone which comprises mixing hydrated basic magnesium carbonate with raw lithopone and calcining the mixture.

3. A process for producing a soft-textured lithopone which comprises mixing about 2% of hydrated basic magnesium carbonate with raw lithopone and calcining the mixture at about 740–820° C.

4. A process for producing a soft-textured lithopone which comprises mixing an aqueous slurry of hydrated basic magnesium carbonate with a slurry of raw lithopone, agitating the same, filtering, drying, calcining, quenching, and wet-grinding the mixture.

5. A process for producing a soft-textured lithopone which comprises mixing an aqueous slurry of hydrated basic magnesium carbonate with a dispersing agent and with a slurry of raw lithopone, agitating the same, filtering, drying, and calcining the mixture.

6. A process for producing a soft-textured lithopone which comprises mixing an aqueous slurry of hydrated basic magnesium carbonate with a dispersing agent and with a slurry of raw lithopone, the proportion of magnesium compound to lithopone being about 2:100, agitating the same, filtering, drying, and calcining the product at about 740–820° C.

7. A process for producing a lithopone pigment which comprises mixing precipitated basic magnesium carbonate in an amount from about 0.25 to 2% of the dry lithopone with raw lithopone and calcining the mixture.

In testimony whereof, I have signed my name to this specification this 10th day of January, 1929.

FRANK G. BREYER